(12) United States Patent
Hayashi et al.

(10) Patent No.: US 6,841,856 B1
(45) Date of Patent: Jan. 11, 2005

(54) INSERT CONDUCTOR FOR USE IN A GENERATOR AND HAVING STRUCTURE FOR PREVENTING DEFORMATION

(75) Inventors: Hideyuki Hayashi, Tokyo (JP); Katsuhiro Sasaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/045,799

(22) Filed: Mar. 23, 1998

(30) Foreign Application Priority Data

Sep. 30, 1997 (JP) .............................. 9-266785

(51) Int. Cl.⁷ ............................ H02K 5/14; H02K 5/00; B29C 70/68
(52) U.S. Cl. ........................... 257/670; 310/71; 310/43; 310/239; 257/666; 29/846; 174/251
(58) Field of Search .......................... 310/239, 71, 43, 310/DIG. 6; 174/121 SR, 250, 251; 29/846, 847, 827; 257/666, 668, 669, 670, 671, 674; 264/157, 272.19, 272.14

(56) References Cited

U.S. PATENT DOCUMENTS

| | | | | |
|---|---|---|---|---|
| 3,544,857 A | * | 12/1970 | Byrne et al. ............... | 29/193.5 |
| 4,028,722 A | * | 6/1977 | Helda .......................... | 357/70 |
| 4,504,752 A | | 3/1985 | Iwaki et al. ............... | 310/68 R |
| 4,845,396 A | * | 7/1989 | Huber ........................ | 310/239 |
| 4,954,872 A | * | 9/1990 | Peterson et al. ............... | 357/70 |
| 5,137,677 A | * | 8/1992 | Murata .................. | 264/272.16 |
| 5,208,499 A | * | 5/1993 | Barber et al. ................. | 310/51 |
| 5,648,682 A | * | 7/1997 | Nakazawa .................. | 257/673 |
| 6,162,381 A | * | 12/2000 | Onishi et al. ............... | 264/157 |

FOREIGN PATENT DOCUMENTS

| | | | | |
|---|---|---|---|---|
| JP | 1-91498 | | 4/1989 | .................. 310/71 |
| JP | 1-45243 | | 12/1989 | .................. 310/71 |
| JP | 4-34995 | * | 2/1992 | ................ 257/673 |
| JP | 4-064414 | | 2/1992 | |
| JP | 05-153751 | | 6/1993 | |

OTHER PUBLICATIONS

Translation of Japanese Patent 04064414, Waratani et al., Jul. 1990.*

* cited by examiner

*Primary Examiner*—Karl Tamai
(74) *Attorney, Agent, or Firm*—Sughrue Mion, PLLC

(57) ABSTRACT

An insert conductor that makes it possible to provide a brush holder that does not have wire portions unnecessarily to the outside and which permits reduced manufacturing cost. The insert conductor is equipped with: a conductor which has a wiring section composed of a plurality of wires, an outer frame surrounding the wiring section, and connections which connect the outer frame with the wiring section and which interconnect the wires, and a deformation preventer which is provided on the conductor to prevent the conductor from being deformed by the resin injection pressure applied during insert resin molding.

15 Claims, 11 Drawing Sheets

INSERT CONDUCTOR FOR USE IN A GENERATOR AND HAVING STRUCTURE FOR PREVENTING DEFORMATION

BACKGROUND OF THE INVENTION

1. Field of the Invention

The present invention relates to an insert conductor used as a component of a brush holder incorporated in, for example, a vehicular charging generator.

2. Description of Related Art

FIG. 8 is a sectional side elevation showing a conventional vehicular charging generator which is equipped with: a case 3 constituted by an aluminum front bracket 1 and a rear bracket 2; a shaft 6 which is provided in the case 3 and which has a pulley 4 fixed on one end thereof; a rotor 7 fixed on the shaft 6; a fan 5 fixed on a side surface of the rotor 7; a stator 8 fixed on an internal surface of the case 3; a slip ring 9 which is fixed on the other end of the shaft 6 and which supplies current to the rotor 7; a pair of brushes 10 which slide on the slip ring 9; a brush holder 11 which houses the brushes 10; and a rectifier 12 which is electrically connected to the stator 8 to rectify the alternating current generated in the stator 8 into direct current.

The vehicular charging generator is equipped with: a heat sink 17 fitted in the brush holder 11; a regulator 18 which is bonded to the heat sink 17 and which regulates the magnitude of the AC voltage generated in the stator 8; and a ventilation guide 19 which is fixed on an outer peripheral section of the brush holder 11 and which guides an airflow generated by the rotation of the fan 5 to the regulator 18 and a stator coil 16.

The rotor 7 is provided with a rotor coil 13 through which a current flows so as to generate a magnetic flux, and an iron, hook-shaped field core 14 which covers the rotor coil 13 and forms a magnetic pole with the magnetic flux.

The stator 8 is equipped with a stator core 15 and the stator coil 16, the conductor of which is wound around the stator core 15 and generates alternating current as the magnetic flux of the rotor 7 changes when the rotor 7 rotates.

In the vehicular charging generator having the configuration described above, current is supplied from a battery, not shown, to the rotor coil 13 via the brushes 10 and the slip ring 9 to generate a magnetic flux, thus forming the magnetic pole in the field core 14. The pulley 4 is driven by an engine and the rotor 7 is rotated by the shaft 6; therefore, the rotating magnetic field is applied to the stator coil 16, and an electromotive force is generated in the stator coil 16.

The first short circuit preventing cover 29a and the second short circuit preventing cover 29b have a U-shaped cross-section, and the third short circuit preventing cover 29c is arc shaped.

The method of manufacturing the brush holder 11 having the aforesaid configuration will now be explained.

First, an iron sheet is subjected to stamping to form a conductor 31 shown in FIG. 11. The conductor 31 has an outer frame 32 and a wiring section 34 connected to the outer frame 32 via connections 33. The wiring section 34 is composed of a plurality of wires 37 connected via the connections 33.

Next, the conductor 31 is subjected to insert resin molding to form a molded unit 36 in which the brush holder main body 22 has been formed on the conductor 31 as shown in FIG. 12.

In the following step, the respective connections 33 are cut by stamping to make the brush holder 11 shown in FIG. 13. FIG. 13 is a rear view of the brush holder 11 shown in FIG. 9.

In designing the brush holder, there are some cases in which, for example, the connector terminals for wiring cannot be positioned in the same plane in the conductor, and the brush holder must be manufactured by having the connector terminals stacked in the middle of the manufacturing process.

FIG. 14 is a front view illustrating a conductor 41 used in the foregoing cases; and FIG. 15 is a front view illustrating a first connector terminal 42 and a second connector terminal 43 combined on the conductor 41.

The conductor 41 has an outer frame 44 and a wiring section 46 connected to the outer frame 44 via connections 45. The wiring section 46 is composed of a plurality of wires 52 interconnected via the connections 45.

The first connector terminal 42 and the second connector terminal 43, which are discrete wires, have engaging holes 47 and 48, respectively, in the middle portions thereof.

In this case, to form a molded unit 49 as shown in FIG. 16, it is necessary to prepare a metal mold provided with pins which penetrate the engaging holes 47 and 48 to position the first and second connector terminals 42 and 43 in relation to the conductor 41. Hence, at the rear of the molded unit 49 shown in FIG. 16, a brush holder main body 50 has pin apertures 51 as illustrated in FIG. 17.

The conventional brush holder 11 shown in FIG. 9 has the following problems: the connections 33 are cut after molding the brush holder main body 22, and portions of the wiring i.e. the exposed portions 28a, 28b, and 28c, are therefore partly exposed to the outside, so that moisture, for example, adheres to those exposed portions 28a, 28b, and 28c, leading to the possibility that the wire will become disconnected due to galvanic corrosion and dissolution.

Further, in order to prevent a short circuit between the exposed portions 28a, 28b, and 28c and the rear bracket 2, the ventilation guide 19 must be provided with the first, second, and third short circuit preventing covers 29a, 29b, and 29c. This inevitably makes the entire configuration of the ventilation guide 19 complicated, and the configuration of the mold for making the ventilation guide 19 accordingly becomes complicated, resulting in higher manufacturing costs for the ventilation guide 19.

Furthermore, in another conventional brush holder, the first and second connector terminals 42 and 43, shown in FIG. 14, are positioned with respect to the conductor 41 by the pins formed on the mold, so that the pin apertures 51 remain in the brush holder main body 50 as shown in FIG. 17. This presents a problem in that the internal surfaces of the engaging holes 47 and 48 of the first and second connector terminals 42 and 43, respectively, are inevitably exposed to the outside through the pin apertures 51, so that moisture enters through the pin apertures 51, leading to the possibility that the wire 52 will become disconnected due to galvanic corrosion and dissolution as in the case of the brush holder 11 mentioned previously.

There has been yet another problem in that the pins engaging with the engaging holes 47 and 48 must be formed on the mold, adding to the manufacturing cost of the mold.

SUMMARY OF THE INVENTION

The present invention has been made with a view toward solving the problems described above, and it is an object of the present invention to obtain an insert conductor which makes it possible to provide a brush holder that does not have wiring positions unnecessarily exposed to the outside and which permits reduced manufacturing costs.

It is another object of the present invention to provide a method of manufacturing a brush holder that employs the aforesaid insert conductor.

According to one aspect of the present invention, there is provided an insert conductor equipped with: a conductor which has a wiring section composed of a plurality of wires, an outer frame surrounding the wiring section, and connections which connect the outer frame and the wiring section and also interconnect the wires; and a deformation preventer which is provided on the conductor such that it extends over at least the end portions of the wires and prevents the conductor from being deformed by the resin injection pressure applied during insert resin molding.

In a preferred form, the conductor of the insert conductor is formed by stamping a single metal sheet.

In another preferred form of the insert conductor, the deformation preventer is provided with engaging portions which engage with the portions to be engaged and which are formed in discrete wires.

In still another preferred form of the insert conductor, the conductor is also provided with discrete wires.

In a further preferred form of the insert conductor, the discrete wires are the connector terminals of a brush holder.

In a further preferred form of the insert conductor, the deformation preventer is composed of polyphenylene sulfide resin.

According to another aspect of the present invention, there is provided a method of manufacturing a brush holder including the steps of: forming a secondary insert conductor, which has a wire and a deformation preventer, by cutting the connections of a primary insert conductor; and forming a brush holder main body by subjecting the secondary insert conductor to insert resin molding.

According to yet another aspect of the present invention, there is provided a method of manufacturing a brush holder including the steps of: forming a secondary insert conductor, which has a wire and a deformation preventer, by cutting the connections of a primary insert conductor; engaging a portion to be engaged of a connector terminal in an engaging portion of the deformation preventer; and subjecting the secondary insert conductor and the connector terminal to insert resin molding so as to form a brush holder main body.

DESCRIPTION OF THE PREFERRED EMBODIMENTS

Figure 1:
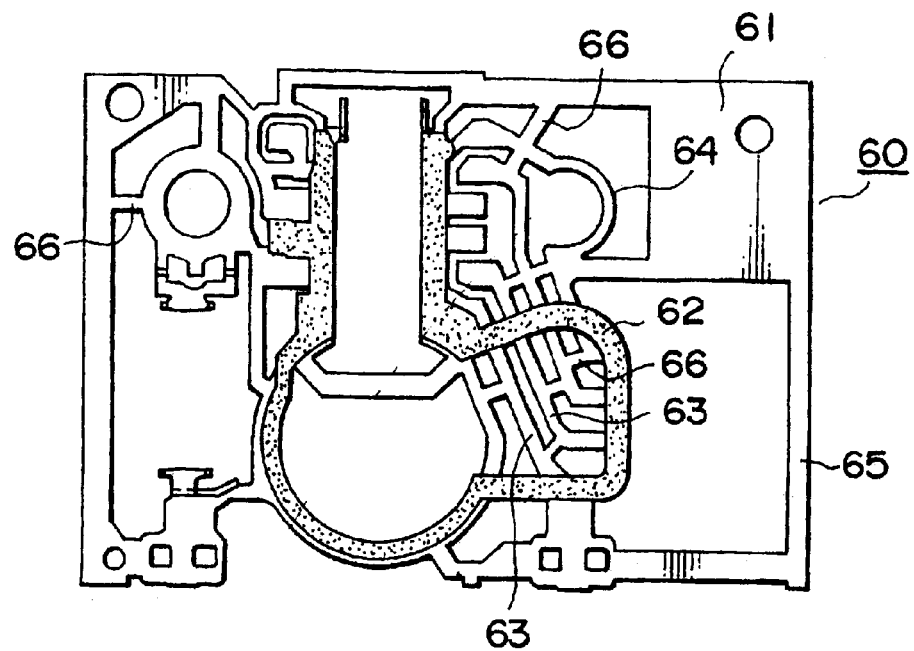
FIG. 1 is a front view illustrating an insert conductor of a first embodiment in accordance with the present invention.

First Embodiment:

FIG. 1 is a front view of a primary insert conductor 60 of a first embodiment according to the present invention. The primary insert conductor 60 is equipped with a conductor 61 made by stamping an iron sheet, and deformation preventers 62 which are provided on both surfaces of the conductor 61 to prevent the conductor 61 from being deformed by the resin injection pressure applied during an insert resin molding process.

The conductor 61 is equipped with a wiring section 64 composed of a plurality of wires 63, an outer frame 65 surrounding the wiring section 64, and connections 66 which connect the outer frame 65 with the wiring section 64 and which also interconnect the wires 63.

Figure 2:
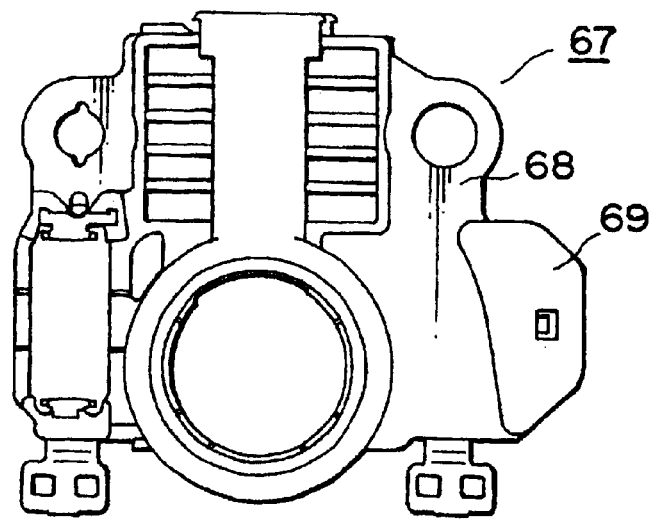
FIG. 2 is a front view illustrating a brush holder manufactured by employing the insert conductor shown in FIG. 1.

FIG. 2 is a front view illustrating a brush holder 67 manufactured by employing the primary insert conductor 60; the brush holder 67 has a wiring section 64 having a connector terminal electrically connected to the battery, and a brush holder main body 68 in which the wires 63 and the deformation preventers 62 have been covered by insert molding with polyphenylene sulfide resin. The brush holder main body 68 has a connector 69 which covers the connector terminal.

The method of manufacturing the brush holder 67 having the foregoing configuration will now be described.

First, the conductor 61, which has the outer frame 65, the connections 66, and the wiring section 64, is formed by stamping an iron sheet. Then, the conductor 61 is subjected to the insert resin molding by using polyphenylene sulfide resin so as to manufacture the primary insert conductor 60 in which both surfaces of the conductor 61 are provided with the deformation preventer 62 to reinforce the mechanical strength of the conductor 61 as shown in FIG. 1. As shown in FIG. 1, deformation preventer 62 is disposed at least over the end of wire 63, thereby preventing the ends of the wires from being deformed. Other portions of the deformation preventer 62 extend laterally across other parts of wires 63.

Figure 3:
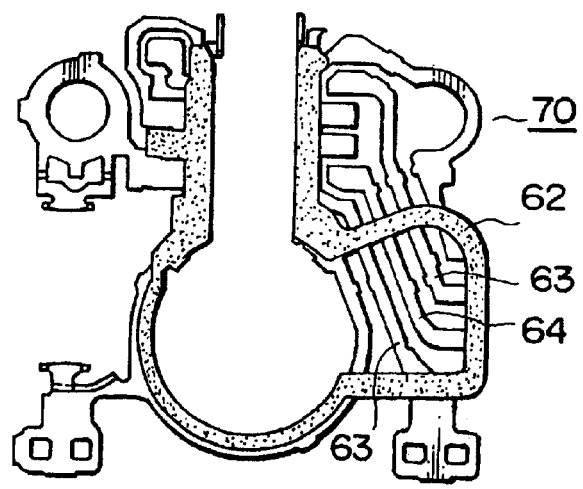
FIG. 3 is a front view illustrating the insert conductor during the manufacturing process of the brush holder shown in FIG. 2.

In the following step, a plurality of the connections 66 are cut by stamping to form a secondary insert conductor 70 illustrated in FIG. 3. The secondary insert conductor 70 is subjected to insert resin molding using polyphenylene sulfide resin so as to make the brush holder 67 in which the secondary insert conductor 70 is embedded in the brush holder main body 68.

In this embodiment, the deformation preventers 62 for reinforcing the mechanical strength of the conductor 61 are provided on both surfaces of the wiring section 64. Accordingly, the secondary insert conductor 70 will not be deformed under the resin injection pressure applied during insert resin molding even when the outer frame 65 and the connections 66, which are unnecessary for the conductor 61, are cut and removed before forming the brush holder main body 68 by insert resin molding, the secondary insert conductor 70 is subjected to the insert resin molding to embed the secondary insert conductor 70.

Figure 4A:
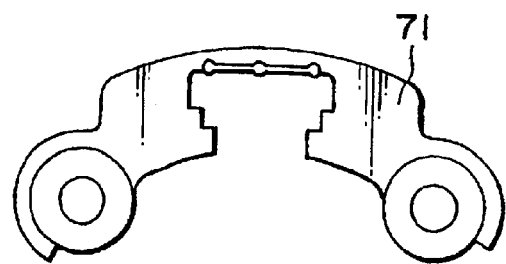
FIG. 4A is a front view illustrating a ventilation guide provided on the brush holder of FIG. 2.
Figure 4B:
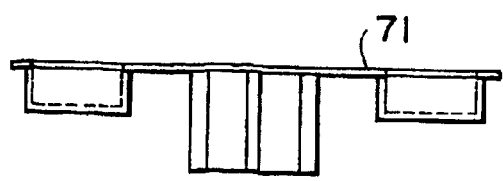
FIG. 4B is a top plan view of FIG. 4A.

In contrast, in the conventional method, the unnecessary portions of the conductor 31 are cut and removed after molding the brush holder main body 22 is molded to avoid deforming the conductor 31 with the resin injection pressure. As a result, the brush holder 11 is manufactured with portions of the wires 20 unnecessarily exposed. However, the brush holder 67 according to this embodiment avoids such exposure. This makes it possible to form a ventilation guide 71 shown in FIG. 4A and FIG. 4B which eliminates the need for the short circuit preventing covers 29a, 29b and 29c which were required to prevent a short circuit between the rear bracket and the exposed portions, thus resulting in reduced manufacturing costs for the ventilation guide 71.

Figure 5A:
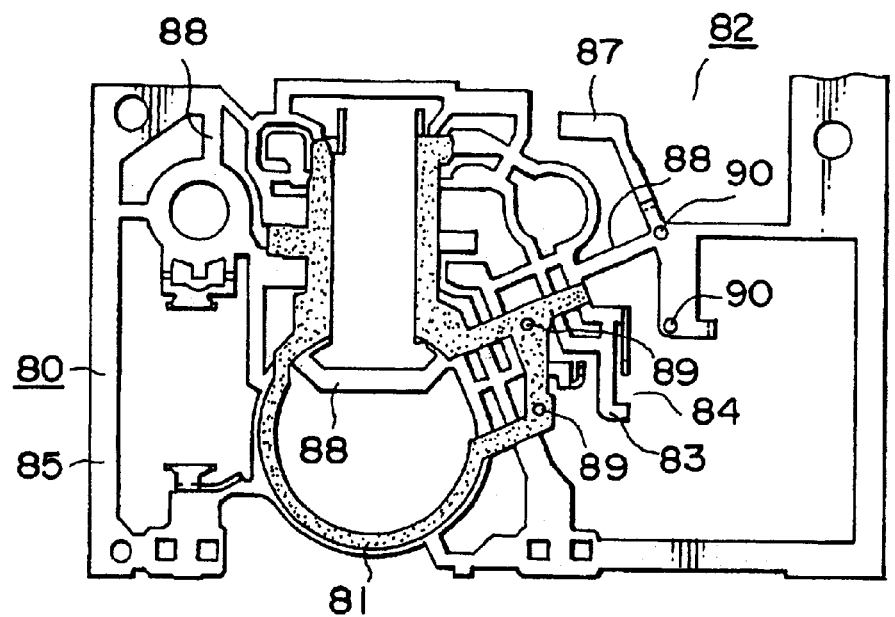
FIG. 5A is a front view illustrating an inert conductor of a second embodiment in accordance with the present invention.
Figure 5B:
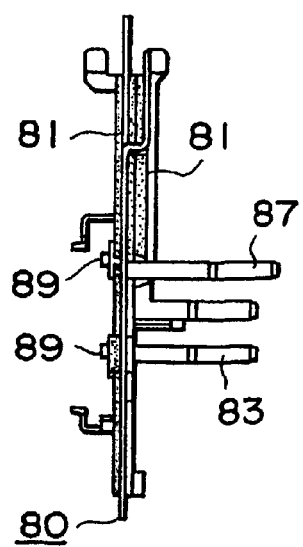
FIG. 5B is a side view of FIG. 5A.

Second Embodiment:

FIG. 5A is a front view illustrating a primary insert conductor 82 in which deformation preventers 81 for reinforcing the mechanical strength of a conductor 80 are formed on both surfaces of the conductor 80; and FIG. 5B is a side view illustrative of an essential section of FIG. 5A.

The conductor 80 is equipped with a wiring section 84 composed of a plurality of wires 83, an outer frame 85 surrounding the wiring section 84, a connector terminal 87 which is composed of a discrete wire, and connections 88 which respectively connect the wiring section 84 and the connector terminal 87.

Protuberances 89 are engaging portions which are formed on the deformation preventer 81. The connector terminal 87 has engaging holes 90 in which the protuberances 89 are engaged.

Figure 6:
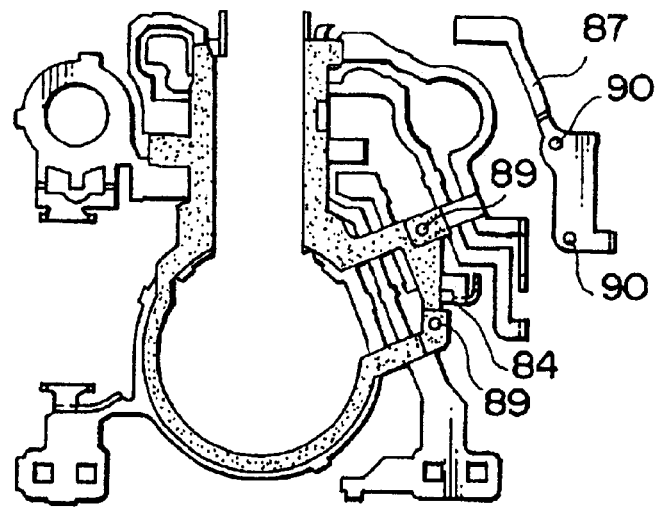
FIG. 6 is a front view illustrating the insert conductor during the manufacturing process of the brush holder.
Figure 7:
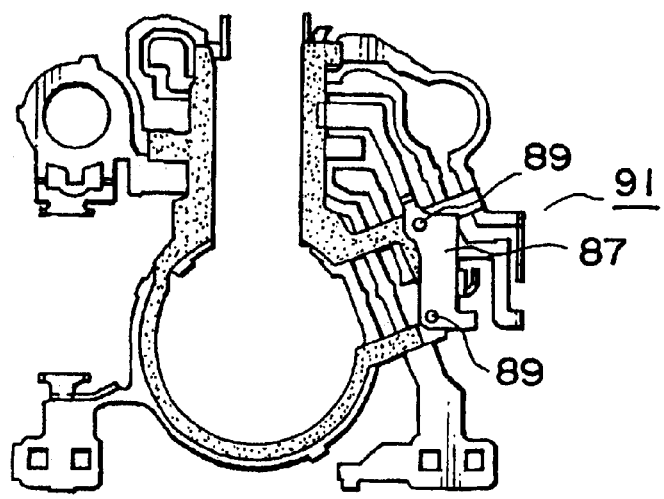
FIG. 7 is a front view illustrating the insert conductor during the manufacturing process of the brush holder.
Figure 8:
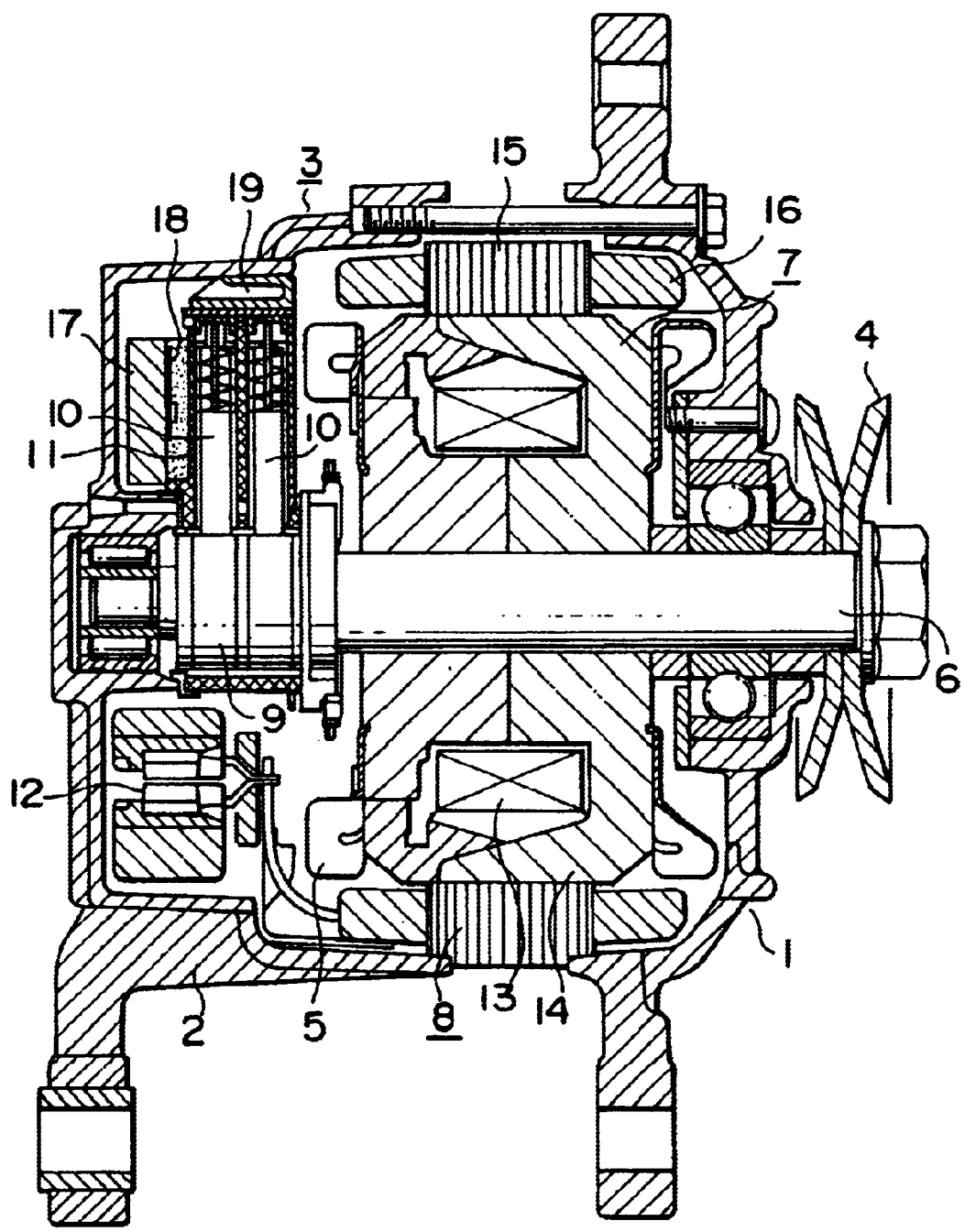
FIG. 8 is a sectional side elevation illustrating a conventional charging generator.
Figure 9A:
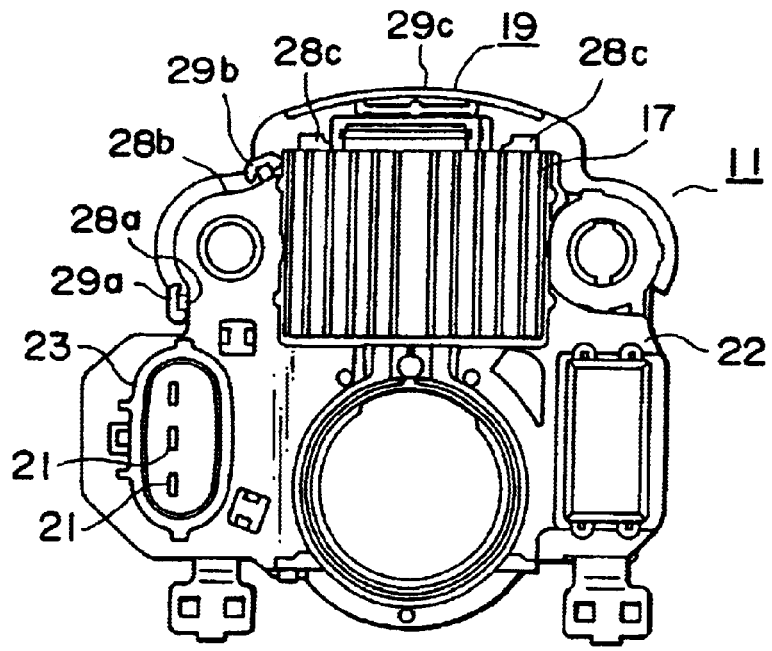
FIG. 9A is a front view illustrating the brush holler shown in FIG. 8.
Figure 9B:
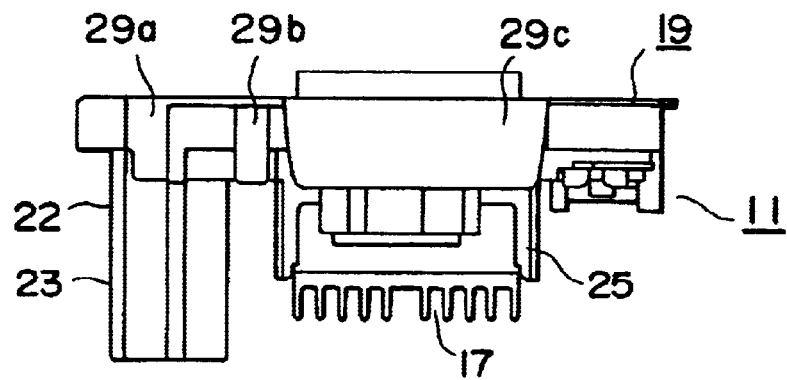
FIG. 9B is a top plan view of the brash holder shown in FIG. 9A.
Figure 10A:
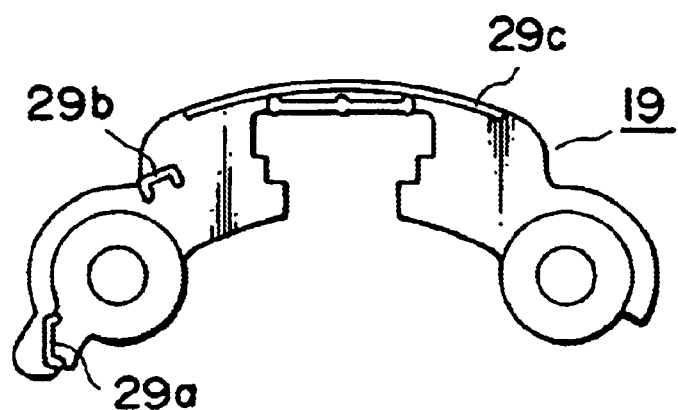
FIG. 10A is a front view illustrating the ventilation guide shown in FIG. 8.
Figure 10B:
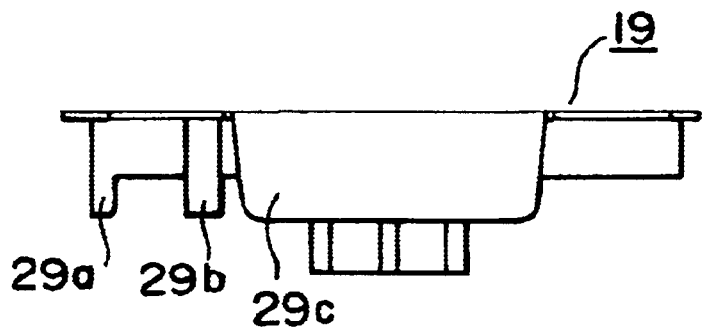
FIG. 10B is a top plan view of FIG. 10A.
Figure 11:
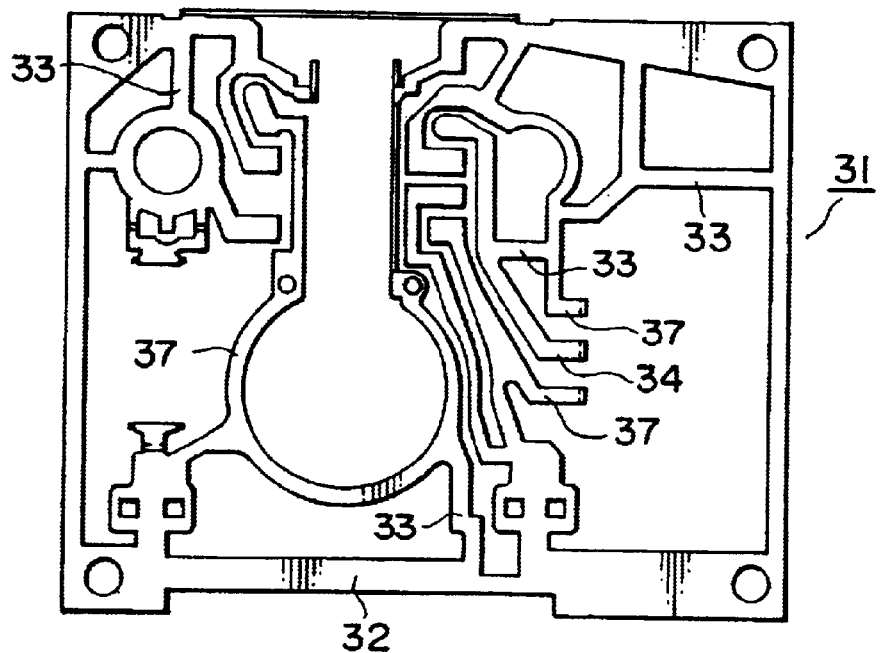
FIG. 11 is a front view illustrating a conductor which is a component of the brush holder shown in FIGS. 9A and 9B.
Figure 12:
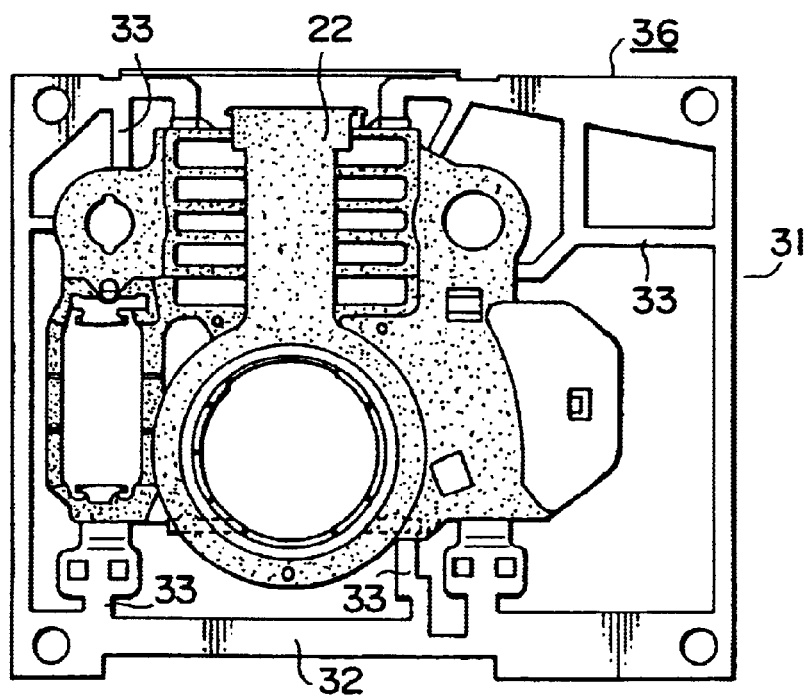
FIG. 12 during a front view illustrating the insert conductor during the manufacturing process of the brush holder shown in FIGS. 9A and 9B.
Figure 13:
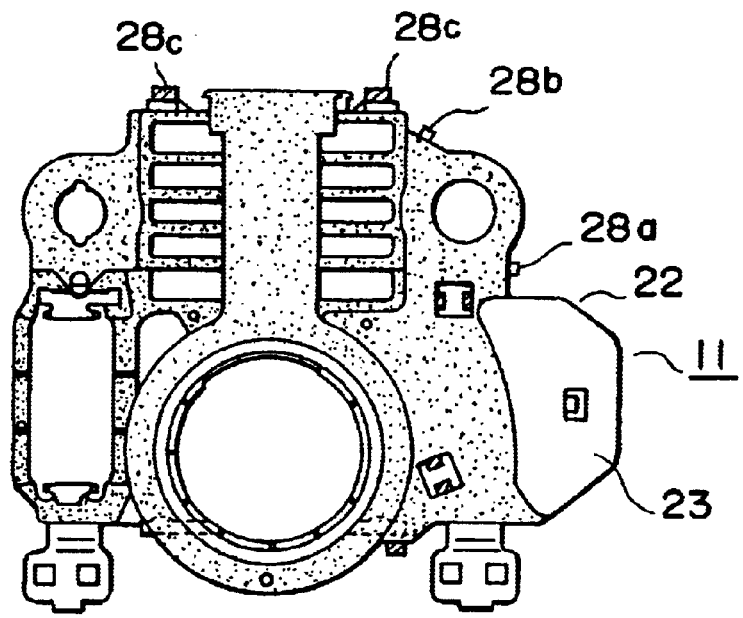
FIG. 13 is a rear view illustrating the brush holder shown in FIGS. 9A and 9B.
Figure 14:
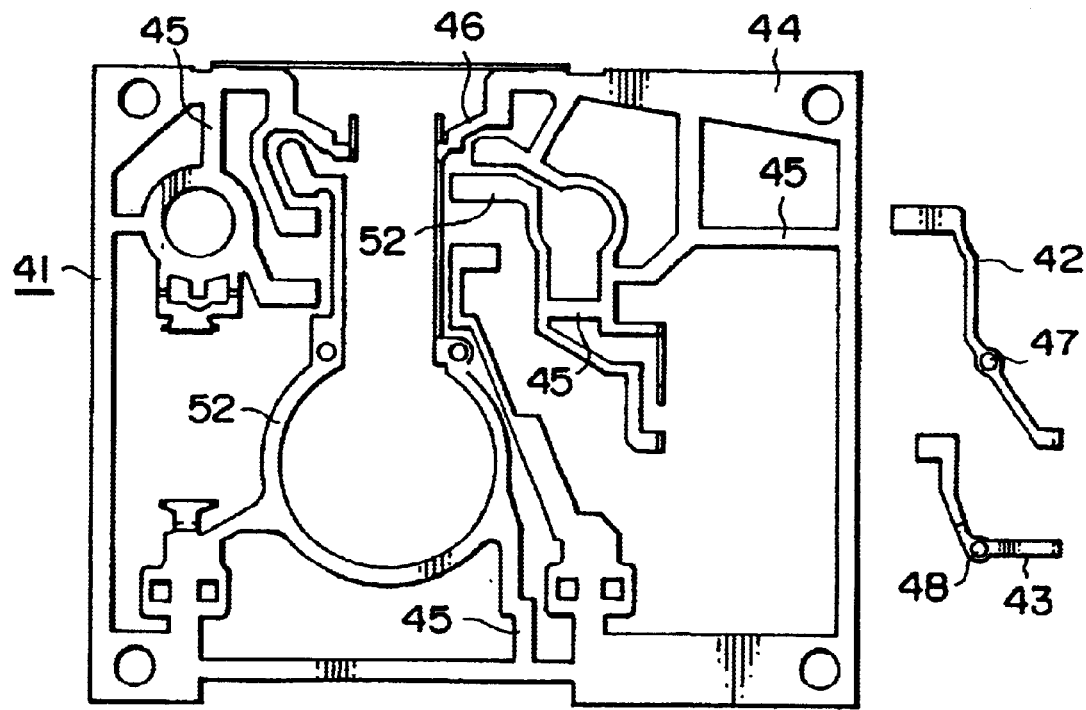
FIG. 14 is a front view illustrating the conductor of another conventional charging generator.
Figure 15:
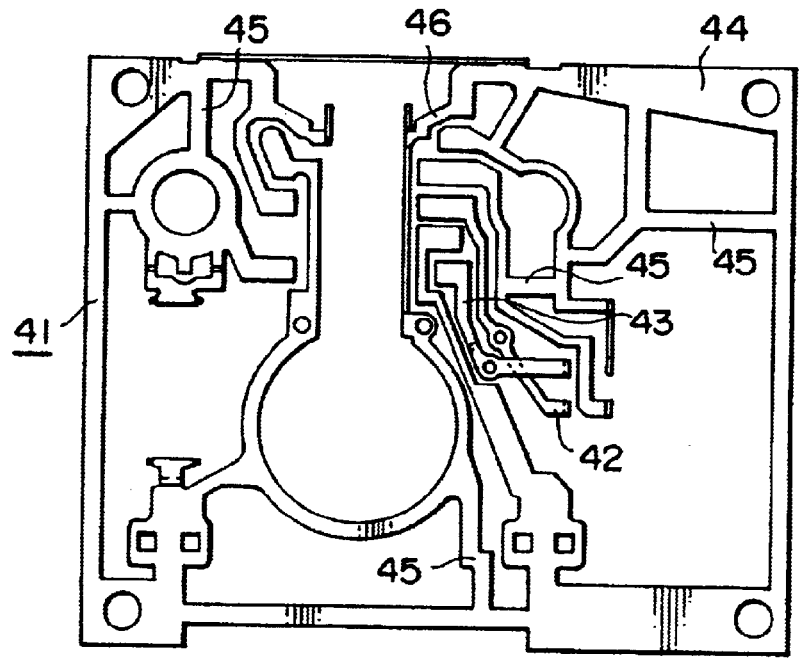
FIG. 15 is a front view illustrating the conductor of FIG. 14 in which a connector terminal has been assembled.
Figure 16:
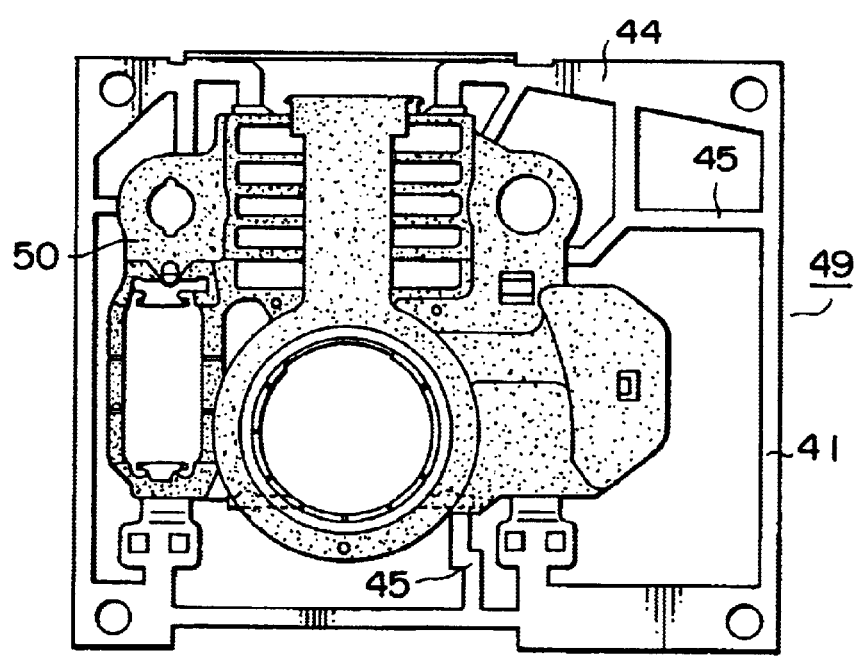
FIG. 16 is a front view illustrating the insert conductor during the manufacturing process of a conventional brush holder.
Figure 17:
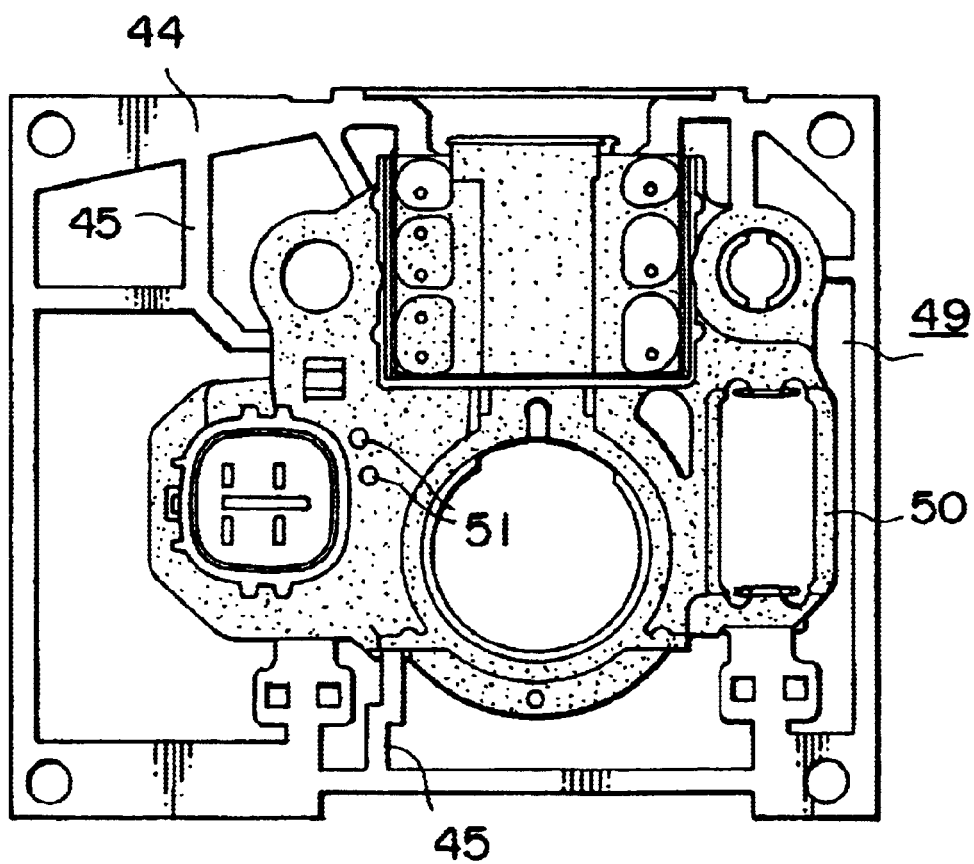
FIG. 17 is a rear view illustrating the insert conductor of FIG. 16.

In this embodiment, the connections 88 of the conductor 80 are cut and the connector terminal 87 is separated from the conductor 80 as shown FIG. 6, then the engaging holes 90 of the connector terminal 87 are secured to the protuberances 89. Next, the protuberances 89 are thermally caulked to secure the connector terminal 87 to the wiring section 84 so as to produce a secondary insert conductor 91 shown in FIG. 7.

The subsequent steps for manufacturing the brush holder are the same as those of the first embodiment; the secondary insert conductor 91 is subjected to insert resin molding using polyphenylene sulfide resin, and the secondary insert conductor 91 is embedded in the brush holder main body to thereby fabricate the brush holder.

Thus, the insert conductor in accordance with the present invention is equipped with: a conductor which has a wiring section composed of a plurality of wires, an outer frame surrounding the wiring section, and connections which connect the outer frame and the wiring section and which also interconnect the wires; and a deformation preventer which is provided on the conductor such that it extends over the wires and prevents the conductor from being deformed by the resin injection pressure during insert resin molding. Hence, the insert conductor will not be deformed by the resin injection pressure applied during insert resin molding even when the outer frame and the connections, which are unnecessary for the conductor, are cut and removed before forming the brush holder main body by insert resin molding. This makes it possible to manufacture a brush holder that does not have wire portions unnecessarily exposed to the outside, thus preventing disconnection of the wires caused by galvanic corrosion and dissolution due to moisture adhesion.

Moreover, it is no longer necessary to provide, (or example, the ventilation guide mounted on a conventional brush holder with the short circuit preventing cover between the exposed portion of the wire and the rear bracket. This allows a simpler configuration and reduced cost for the ventilation guide.

Further, the conductor of the insert conductor in accordance with the present invention is formed by stamping a single metal sheet, making it possible to simultaneously and easily form the outer frame, the wiring section, and the connections making up the conductor.

Furthermore, in the insert conductor according to the present invention, since the deformation preventer is provided with engaging portions which engage the portions to be engaged and which are formed on discrete wires, it is possible to position the discrete wires in relation to the conductor via the deformation preventer. This prevents the pin apertures formed by the pins of the mold from remaining in the brush holder main body and accordingly prevents the internal surfaces of the engaging holes of the discrete wires, which are engaged with the pins, from being exposed outside.

In addition, it is no longer necessary to form any pins on the mold, resulting in reduced costs for manufacturing the mold.

In the insert conductor according to the present invention, the conductor is also provided with discrete wires; hence, the discrete wires can be easily formed at the same time as the outer frame, the wiring section, and the connections making up the conductor.

Further, in the insert conductor according to the present invention, the discrete wires act as the connector terminals of the brush holder; hence, the connector terminals can be easily formed at the same time as the outer frame, the wiring section, and the connections making up the conductor.

Furthermore, in the insert conductor, the deformation preventer is composed of a polyphenylene sulfide resin, which makes it possible to provide a deformation preventer that exhibits good insulating properties, heat resistance, mechanical strength, and formability.

The method of manufacturing a brush holder in accordance with the present invention includes the steps of: forming a secondary insert conductor, which has a wire and a deformation preventer, by cutting the connections in a primary insert conductor; and forming a brush holder main body by subjecting the secondary insert conductor to insert resin molding, thus making it possible to easily manufacture a brush holder that does not have wire portions unnecessarily exposed to the outside.

The method of manufacturing a brush holder in accordance with the present invention includes the steps of: forming a secondary insert conductor, which has wires aril a deformation preventer, by cutting connections in a primary insert conductor; engaging a portion to be engaged of a connector terminal in an engaging portion of the deformation preventer; and subjecting the secondary insert conductor and the connector terminal to insert resin molding so as to form a brush holder main body, thus making it possible to easily manufacture at a lower cost a brush holder that does not have wire portions unnecessarily exposed to the outside.

What is claimed is:

1. An insert conductor comprising:

a conductor having a wiring section with a plurality of wires, an outer frame surrounding the wiring section, and connections connecting said outer frame and said wiring section and interconnecting said wires; and a deformation preventer provided on both upper and lower surfaces of said conductor and completely covering at least an end of both upper and lower surfaces of said wires, said deformation preventer being operable to prevent at least the end of the wires from being deformed during a cutting or an insert resin molding procedure.

2. The insert conductor according to claim 1, wherein said conductor is formed by stamping a single metal sheet.

3. The insert conductor according to claim 1, wherein said deformation preventer includes an engaging portion operable to engage a discrete wire.

4. The insert conductor according to claim 3, wherein said discrete wire is included in said conductor.

5. The insert conductor according to claim 3, wherein said discrete wire is a connector terminal of a brush holder.

6. The insert conductor according to claim 1, wherein said deformation preventer is composed of polyphenylene sulfide resin.

7. A vehicle generator comprising:

a fan which generates airflow;

a regulator;

a stator coil;

a brush holder; and a ventilation guide fixed to a peripheral portion of said brush holder, said ventilation guide operable to guide airflow, generated by said fan, to said regulator and said stator coil;

wherein, said brush holder includes, a conductor with a wiring section composed of a plurality of wires, an outer frame surrounding the wiring section, and connections connecting said outer frame and said wiring section and which interconnect said wires; and an insulating member disposed on at least an end of both ton and bottom surfaces of the wires, said insulating member completely covering the end of the wires and being operable to prevent at least the end of the wires from being deformed during a cutting or an insert resin molding procedure.

8. The vehicle generator according to claim 7, wherein said conductor is formed by stamping a single metal sheet.

9. The vehicle generator according to claim 7, wherein said insulating member includes an engaging portion operable to engage a discrete wire.

10. The vehicle generator according to claim 9, wherein said discrete wire in included is said brush holder.

11. The vehicle generator according to claim 9, wherein said discrete wire is a connector terminal of said brush holder.

12. The vehicle generator according to claim 7, wherein said insulating member is composed of polyphenylene sulfide resin.

13. A brush holder used in a vehicle charging system, the brush holder comprising:

an insert conductor with a plurality of wires;

a deformation preventer provided on both top and bottom surfaces of said insert conductor, said deformation preventer completely covering an end of at least some of the plurality of wires and being operable to prevent the end of the wires from being deformed; and a coating covering said insert conductor and said deformation preventer, including the end of the wires.

14. A brush holder as claimed in claim 13 wherein said deformation preventer comprises polyphenylene sulfide.

15. A brush holder as claimed in claim 13 wherein said deformation preventer traverses both horizontally and vertically across the top and bottom surfaces of said insert conductor.

* * * * *